(12) United States Patent
Nordbruch (10) Patent No.: US 9,126,529 B2
(45) Date of Patent: Sep. 8, 2015

(54) METHOD FOR CONTROLLING A LIGHT EMISSION OF A HEADLIGHT OF A VEHICLE

(75) Inventor: Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 262 days.

(21) Appl. No.: 13/587,718

(22) Filed: Aug. 16, 2012

(65) Prior Publication Data

US 2013/0051042 A1 Feb. 28, 2013

(30) Foreign Application Priority Data

Aug. 23, 2011 (DE) .......................... 10 2011 081 367

(51) Int. Cl.
- *B60Q 1/04* (2006.01)
- *B60Q 1/08* (2006.01)
- *B60Q 1/02* (2006.01)

(52) U.S. Cl.
CPC . *B60Q 1/085* (2013.01); *B60Q 1/02* (2013.01); *B60Q 2300/056* (2013.01); *B60Q 2300/41* (2013.01); *B60Q 2300/42* (2013.01); *B60Q 2300/45* (2013.01)

(58) Field of Classification Search
CPC ............. B60Q 1/085; B60Q 2300/056; B60Q 2300/42; B60Q 2300/45; B60Q 2300/41; B60Q 1/02
USPC ......... 701/36; 315/82; 438/27; 362/466, 464, 362/465; 382/274
See application file for complete search history.

(56) References Cited

U.S. PATENT DOCUMENTS

| 5,796,094 | A | * | 8/1998 | Schofield et al. | .......... 250/208.1 |
| 6,025,797 | A | * | 2/2000 | Kawai et al. | .................... 342/70 |
| 6,246,949 | B1 | * | 6/2001 | Shirai et al. | ...................... 701/96 |
| 6,485,168 | B2 | * | 11/2002 | Rosenhahn et al. | .......... 362/465 |
| 7,782,184 | B2 | * | 8/2010 | Wittorf et al. | ................. 340/468 |
| 8,068,135 | B2 | * | 11/2011 | Kim | ................. 348/148 |
| 8,310,662 | B2 | * | 11/2012 | Mehr et al. | ..................... 356/121 |
| 2002/0080618 | A1 | * | 6/2002 | Kobayashi et al. | ........... 362/466 |
| 2006/0006988 | A1 | | 1/2006 | Harter, Jr. et al. | |

(Continued)

FOREIGN PATENT DOCUMENTS

| DE | 10 2004 028 772 | | 1/2006 |
| DE | 10 2005 026 684 | | 1/2006 |
| DE | 10 2004 050 597 | | 4/2006 |
| DE | 10 2008 041 355 | | 8/2008 |
| DE | 10 2008 061 747 | | 6/2009 |
| DE | 10 2008 058 386 | | 5/2010 |
| DE | 10 2009 048 619 | | 6/2010 |
| DE | 10 2010 007 866 | | 8/2011 |
| EP | 2 068 071 | | 6/2009 |
| EP | 1970249 | A3 * | 7/2009 |
| EP | 2 420 986 | | 2/2012 |
| JP | 2008230546 | A * | 10/2008 |
| JP | 2011-84106 | | 4/2011 |
| WO | WO 03/106219 | | 12/2003 |
| WO | WO 2010/020460 | | 2/2010 |

OTHER PUBLICATIONS

Broggi, A., Fedriga, R.L., Tagliati, A., "Pedestrian Detection on a Moving Vehicle: an Investigation about Near Infra-Red Images," Publication Year: 2006 , pp. 431-436.*

*Primary Examiner* — Tuan C. To (74) *Attorney, Agent, or Firm* — Kenyon & Kenyon LLP (57) ABSTRACT

A method for controlling a light emission of at least one headlight of a vehicle includes: reading in at least one danger warning signal from a receiving device, the at least one danger warning signal indicating a danger position; checking whether the danger position indicated by the at least one danger warning signal is within a tolerance range on a route currently being traveled by the vehicle; and changing the light emission of the at least one headlight from a first radiation characteristic to a second radiation characteristic, if the danger position lies within the tolerance range on the route being currently traveled by the vehicle, in order to control the light emission of the at least one headlight.

21 Claims, 4 Drawing Sheets

(56) References Cited

U.S. PATENT DOCUMENTS

| | | | |
|---|---|---|---|
| 2006/0083014 A1* | 4/2006 | Kanzler et al. | 362/514 |
| 2008/0062706 A1* | 3/2008 | Feldmeier | 362/459 |
| 2008/0298077 A1* | 12/2008 | Naganawa et al. | 362/466 |
| 2009/0080210 A1* | 3/2009 | Reiners et al. | 362/523 |
| 2009/0196061 A1* | 8/2009 | Nakamura et al. | 362/523 |
| 2010/0191418 A1 | 7/2010 | Mimeault et al. | |
| 2011/0084609 A1* | 4/2011 | Kawaguchi et al. | 315/77 |
| 2011/0194302 A1* | 8/2011 | Kishimoto et al. | 362/511 |
| 2012/0002056 A1* | 1/2012 | Nam et al. | 348/169 |
| 2012/0067122 A1* | 3/2012 | Sakamoto et al. | 73/493 |
| 2012/0271511 A1* | 10/2012 | Dierks et al. | 701/36 |

* cited by examiner

METHOD FOR CONTROLLING A LIGHT EMISSION OF A HEADLIGHT OF A VEHICLE

BACKGROUND OF THE INVENTION

1. Field of the Invention

The present invention relates to a device and a method for controlling a light emission of a headlight of a vehicle, as well as to a computer-program product having program codes which are stored on a computer-readable medium, for carrying out such a method when the program is run on a computer device.

2. Description of the Related Art

In road traffic, dangers such as non-lit up vehicles, objects, animals or persons on the roadway, or the like, above all in the dark and also at high speeds, frequently lead to severe traffic accidents resulting in dead and severely injured people, since the dangers are realized too late, based on a lack of adaptation of the light emission of the headlights.

Published German patent application document DE 10 2008 041 355 A1 describes a method, a device, a computer program and a computer program product for controlling a lighting system of a motor vehicle, in particular a headlight system of a motor vehicle involved in road traffic. The control process involves performing the steps: detecting a current traffic situation including at least detecting a motor vehicle speed and detecting a state of the lighting system and adjusting the state of the lighting system as a function of the detected traffic situation, the detection of the current traffic situation furthermore including the step of detecting an obstacle, in order to adjust the lighting system as a function of the traffic situation thus determined.

BRIEF SUMMARY OF THE INVENTION

The present invention provides a device and a method for controlling a light emission of a headlight of a vehicle, as well as a computer-program product having program codes which are stored on a computer-readable medium, for carrying out such a method when the program is run on a computer device.

The method according to the present invention for controlling a light emission of at least one headlight of a vehicle, which method utilizes a receiving device, includes the following steps:

reading in at least one danger warning signal transmitted using the receiving device, the at least one danger warning signal indicating a danger position at which an object is located, which represents danger for the vehicle or (an)other vehicle(s);

checking whether the danger position indicated by the at least one danger warning signal is within a tolerance range on the route currently being traveled by the vehicle; and changing the light emission of the at least one headlight from a first radiation characteristic to a second radiation characteristic if the danger position is within the tolerance range of the route being currently traveled by the vehicle, in order to control the light emission of the at least one headlight.

The vehicle may be a motor vehicle, particularly a road-bound motor vehicle, such as a passenger car, a truck, a vehicle for the transport of persons or another type of commercial vehicle. The at least one headlight may be a front headlight of the vehicle, for example. The light emission of the headlight, in this case, may be changeable in steps or in a stemless manner. The light emission of the headlight may be changed, in this instance, with respect to the radiation characteristic of the headlight. The radiation characteristic may refer to a brightness, an illumination angle, a width or size of a roadway area to be illuminated, a height of illumination, an illumination pattern, a switching on or off of illumination means and/or the like, which characterize a light emission by the headlights.

The receiving device is developed to receive the at least one danger warning signal. The receiving device may be connected to or be a part of a navigational device and/or another type of mobile data transmission unit, such as an Internet-capable mobile telephone. The at least one danger warning signal is transmitted via a traffic broadcast (having a traffic broadcast receiving device) and/or the Internet and/or C2X or C2C communications connections. The at least one danger warning signal may thus be also associated with an Internet service. The Internet service may have a data bank on the Internet, having traffic danger announcements. The at least one danger warning signal may be received or called up, in the form of data, by such an Internet service by a navigational device and/or an Internet-capable mobile phone.

The at least one danger warning signal may have a standardized format. The at least one danger warning signal represents a danger position. The danger position is a geographic position at which a dangerous situation in the road traffic is present. The position is either a point or a stretch of road or a region, for instance, of one highway exit to the following one. Messages with respect to objects which endanger road traffic are radiated via traffic radio. Examples of such objects are people, objects, etc., which are made available in the form of danger warning signals and an associated position. Vehicles, objects, animals and/or persons on the roadway are announced on traffic radio, above all for superhighways and federal roads. Examples are, among other things, a non-lit up vehicle in a certain lane, on a certain superhighway, in a certain direction before a certain exit point; a trailer in a certain lane, on a certain superhighway, in a certain direction between two places; an exhaust pipe, tires or other objects on a certain superhighway, in a certain direction after a certain exit point; persons on a certain Federal road between two places; boars or other animals on a certain superhighway between two places. The danger position may also be represented in the form of coordinates by the at least one danger warning signal. A navigational device is able to process the coordinates of the danger position.

A navigational device is able to download the danger warning signal from the traffic broadcast and show and process dangers with their danger positions. A navigational device, or rather the maps it is based on, makes available roads inclusive of their lanes. A navigational device may be developed to determine a position of the vehicle in which the navigational device is situated, and, based on user inputs, may calculate a route. The navigational device may have map data. With the aid of positional determination and stored geodata, a navigational device makes possible the navigation to a selected location or a route, while taking into account desired criteria. It is therefore to be expected that the vehicle will be moving on this route. By tolerance range one may understand an area about this route which includes the route and an area going beyond the edge of the route, for instance, the tolerance range may have twice the width of the road the vehicle will be traveling. In this way objects, to which a danger position has been assigned in the danger warning signal, and which are not exactly located on the route, but in the edge region of the route, for instance, on the side strip of a superhighway, are also able to be regarded and taken into account as dangers.

The present invention also provides a device that is developed to carry out or implement the steps of the method according to the present invention. The device may particularly have units that are developed to carry out the steps of the method. The object on which the present invention is based may be attained quickly and efficiently by this embodiment variant of the invention in the form of a device, as well.

In the case at hand, by a device one may understand an electrical device or a control unit which processes sensor signals and outputs control signals as a function thereof. The device may have an interface, which may be developed as hardware and/or software. In a hardware design, the interfaces may, for example, be part of a so-called system ASIC that contains the most different functions of the device. However, it is also possible for the interfaces to be separate, integrated switching circuits or to be at least partially made up of discrete components. In a software design, the interfaces may be software modules which are present on a microcontroller in addition to other software modules, for example.

An advantageous development also includes a computer program product having program code that is stored on a computer-readable medium such as a semiconductor memory, a hard-disk memory or an optical memory, which is used to implement the method according to one of the specific embodiments described above, when the program is executed on a computer.

The present invention is based on the knowledge that the control of a light emission of at least one headlight of a vehicle, for example, also an adaptation of intelligent vehicle light systems, may advantageously take place based on traffic broadcast danger warnings, and an important aspect of this invention is an adaptation of the control of the light emission of the at least one headlight of the vehicle towards a traffic broadcast danger warning with respect to the danger announced. The adaptation may, for instance, use a navigational device or the like, as well as intelligent and adaptive light systems, and this may additionally be broadened using a vehicle light detection system.

One advantage of the present invention is that the driver has an optimal view onto a danger situation as early as possible. Consequently, traffic safety may be improved and the risk of accident may be reduced. In addition, the control of the light emission, while using the danger warning signal, represents a cost-effective and space-saving design approach, because in part, input variables and devices that are already present are able to be used. The danger warning signals also represent a reliable data basis.

Thus, in the step of changing, the first radiation characteristic is able to represent an original radiation characteristic. The second radiation characteristic may also represent a radiation characteristic adjusted to the indicated danger position. In this context, the indicated danger position may be illuminated more brightly by illumination using the second radiation characteristic than by illumination using the first radiation characteristic. The first or original radiation characteristic may, for instance, represent a lower beam light or an upper beam light, or be similar to a lower beam light or an upper beam light. The second radiation characteristic, or rather the one adjusted to the indicated danger position, may represent an upper beam light, a swiveling headlight or the like, for example, or be similar to an upper beam light, a swiveling headlight or the like. Consequently, the second radiation characteristic may have with respect to the first radiation characteristic a changed brightness, a changed illumination angle, a changed width or a changed size of the roadway area in front of the vehicle that is to be illuminated, a changed illumination height, a changed illumination pattern and/or the like. The adaptation is that the driver is provided with a better view onto the danger position. The improved view is, for example, that the vehicle light is adjusted in such a way that the danger position is lit up or illuminated as early and/or clearly or completely as possible. Such a specific embodiment offers the advantage that an optical lighting up of the danger position is able to take place. Thus, the view onto the danger position may be further improved for the driver vehicle so that traffic safety is further improved.

Furthermore, a step may be provided for determining the second radiation characteristic based on the at least one danger warning signal or based on the at least one danger warning signal as well as on a position of at least one additional vehicle in the surroundings of the indicated danger position. The position of the at least one additional vehicle may be ascertained, for example, using a vehicle camera which has an object detection function. Such a specific embodiment offers the advantage that a radiation characteristic may be set that is individually adjusted to the optimal lighting up of the danger position, which further reduces the danger of an accident. In this instance, the dazzling of other traffic participants may also be avoided or reduced in addition. Thereby traffic safety is further increased.

In addition, a step of reading in at least one danger warning signal may be read in, which in addition indicates a danger property. The danger property may, for instance, include information as to whether the danger originates with a stationary object or with a moving one. The danger property may also represent a speed, a direction of motion, the number of objects with which the danger originates and/or the like. The danger property which is indicated in the at least one danger warning signal may be taken into account in the step of changing the light emission and/or in the step of determining the second radiation characteristic. Such a specific embodiment offers the advantage that the radiation characteristic of the at least one headlight of the vehicle is thus able to be adjusted even more exactly to the danger that is to be expected, and thus the traffic safety is increased even further.

Moreover, a step may be provided of ascertaining the tolerance range as a function of at least one danger warning signal or as a function of the at least one danger warning signal as well as a road property at the indicated danger position. The tolerance range may be ascertained as a function of the danger position. In addition or alternatively, the tolerance range may be ascertained as a function of the danger property, for example. In this context, in the case of ascertaining the tolerance range, it may be taken into account whether the object, with which the danger originates, is a moving object or a static object. The roadway property may be a width, an inclination, a bend, etc., in the road. The accuracy of the indication of the danger position in the at least one danger warning signal may also be taken into account during the ascertaining of the tolerance range. Such a specific embodiment offers the advantage that a safety buffer is created, which is able to compensate for potentially inaccurate indications in the at least one danger warning signal and the like, so that a reliable improvement of the view onto the danger position is able to be assured.

In particular, the step of changing the light emission of the at least one headlight may be changed when the vehicle has approached the danger position indicated except for a specifiable distance. The distance is able to be specified based on the at least one danger warning signal. In particular, the distance may be specified based on a danger property. For instance, if the object, from which the danger originates, moves, an estimated movement of the object in the specifiable distance may be taken into account. Such a specific embodiment offers the advantage that a safety buffer is created here too, which is able to compensate for potentially inaccurate indications in the at least one danger warning signal and the like, so that a reliable and timely improvement of the view onto the danger position is able to be assured.

According to one specific embodiment, a step may be provided of changing the light emission of the at least one headlight from the second radiation characteristic to a third radiation characteristic, if the vehicle has passed the danger position. The light emission is able to be changed to the third radiation characteristic if the change or the return to the first radiation characteristic is unsuitable when taking into account a traffic situation after passing the danger position. This may be the case, for example, if other vehicles would be dazzled by the first radiation characteristic or the like. Such a specific embodiment offers the advantage that a flexible reaction to a current traffic situation is possible, and, even after passing the danger position, dazzling other vehicles is able to be reduced or avoided.

Furthermore, an illumination characteristic is also conceivable in each phase, which carries out the illumination not (only) for the host vehicle but also for other traffic participants.

According to one additional specific embodiment, a step of restoring the first radiation characteristic of the light emission of the at least one headlight may be provided when the vehicle has passed the danger position. In this case, the first radiation characteristic is able to be restored starting from the second radiation characteristic. Alternatively or in addition, the first radiation characteristic may also be restored starting from the third radiation characteristic. The first radiation characteristic is able to be restored when the first radiation characteristic is suitable for the current traffic situation after passing the danger position. This may be the case, for example, when the traffic situation after passing the danger position corresponds essentially to the traffic situation at a point in time of changing the light emission from the first radiation characteristic to the second radiation characteristic. Such a specific embodiment offers the advantage that the original light emission is restored when the traffic situation permits it, so that the light emission, during continued travel of the vehicle is able to be adjusted optimally to the traffic situation.

DETAILED DESCRIPTION OF THE INVENTION

In the figures, same or similar elements are shown by same or similar reference numerals, a repeated description of these elements being omitted. Furthermore, the figures in the drawings and their description contain numerous features in combination. In this context, it is clear to one skilled in the art that these features may also be considered individually or may be combined to form further combinations not explicitly described here. Furthermore, the present invention will perhaps be explained in the following description using different measures and dimensions, while the present invention should be understood as not being restricted to these measures and dimensions. Furthermore, method steps according to the present invention may also be carried out repeatedly, as well as in a different sequence than the one described. If an exemplary embodiment includes an "and/or" linkage between a first feature/step and a second feature/step, this may be read to mean that the exemplary embodiment, according to one specific embodiment has both the first feature/the first step and also the second feature/the second step, and according to an additional specific embodiment, has only the first feature/step or only the second feature/step.

Figure 1:
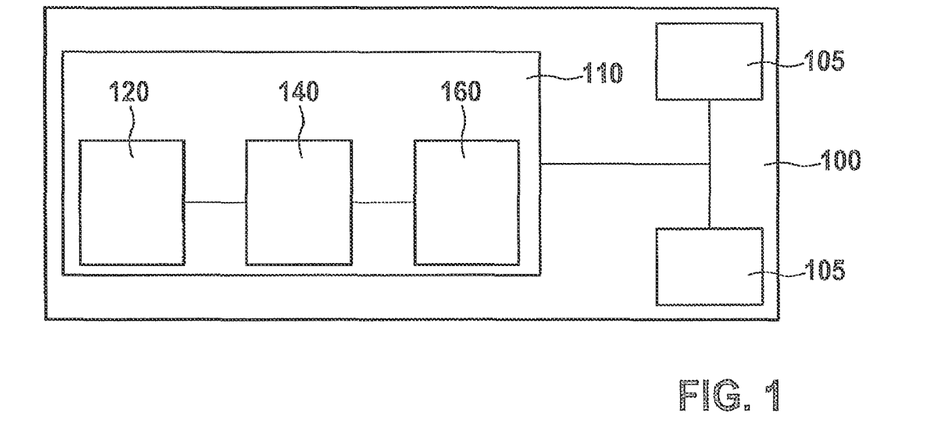
FIG. 1 shows a schematic illustration of a vehicle having a control device according to an exemplary embodiment of the present invention.

FIG. 1 shows a schematic illustration of a vehicle 100 having a control device according to an exemplary embodiment of the present invention. Vehicle 100 has two headlights 105, for example, a control device 110, a reading in device 120, a checking device 140 and a changing device 160. The two headlights 105 are connected to control device 110, for instance, via at least one signal line. Control device 110 has read-in device 120, setting device 140 and changing device 160.

Headlights 105 are able to receive a control signal from control device 110, via the at least one signal line. The control signal has the effect that a change in the light emission of the headlights 105 takes place. One single headlight 105 may have one or more illumination means and/or a different radiation characteristic from an additional headlight.

Control device 110 is developed to carry out a control of a light emission of headlights 105 of vehicle 100. In particular, control device 110 is developed to carry out a control of the light emission of headlights 105 of vehicle 100 with respect to at least one danger warning signal. Read-in device 120, checking device 140 and changing device 160 of control device 110 are connected to one another via at least one communications interface. In this connection, checking device 140 is connected between read-in device 120 and changing device 160. Even if it is not shown in FIG. 1, control device 110 is able to have an input interface. Control device 110 may be developed to receive at least one danger warning signal via the input interface. The danger warning signal is able to be output by a receiving device to the control device. Furthermore, control device 110 may be developed to receive travel data via the input interface. The travel data may be output by a navigational device to control device 110. The travel data may have position data, route data and the like. Control device 110 is able to output a control signal to headlights 105, via the at least one signal line. Control device 110 is developed to control the light emission of headlights 105 via the control signal.

Read-in device 120 of control device 110 is developed to read in the at least one traffic sign recognition signal from the reception device. In this context, the at least one danger warning signal indicates a danger position. Read-in device 120 is able to output the at least one danger warning signal to checking device 140.

Checking device 140 is able to receive the at least one danger warning signal from read-in device 120. Checking device 140 is developed to check whether the danger position indicated by the at least one danger warning signal is within a tolerance range on a route currently being traveled by the vehicle 100. Checking device 140 is able to output the result of the checking in the form of a checking signal to changing device 160. The checking signal may have a first logical value if the danger position indicated by the at least one danger warning signal is within a tolerance range on a route currently being traveled by the vehicle 100. The checking signal may have a second logical value if the danger position indicated by the at least one danger warning signal is outside the tolerance range on the route currently being traveled by the vehicle 100.

Checking device 160 is able to receive the checking signal from checking device 140. Changing device 160 is developed to change the light emission of headlights 105 from a first radiation characteristic to a second radiation characteristic, if the danger position is within the tolerance range on the route that is currently being traveled by the vehicle. Changing device 160 is able to generate the control signal, the control signal representing the change in the radiation characteristic.

Figure 2:
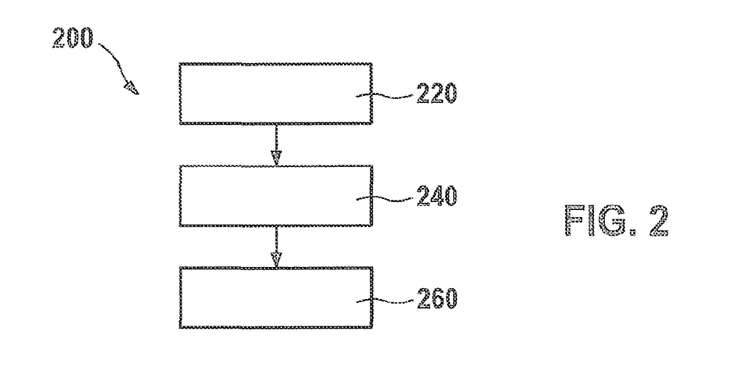
FIG. 2 shows a flow chart of a method according to one exemplary embodiment of the present invention.

FIG. 2 shows a flow chart of a method 200 for controlling a light emission of at least one headlight of a vehicle, in accordance with one exemplary embodiment of the present invention. In this context, method 200 utilizes a receiving device. Method 200 has a step of reading in 220 of at least one danger warning signal from the receiving device, the at least one danger warning signal indicating a danger position. Method 200 also has a step of checking 240 whether the danger position indicated by the at least one danger warning signal is within a tolerance range on a route currently being traveled by the vehicle. Moreover, method 200 has a step of changing 260 the light emission of the at least one headlight from a first radiation characteristic to a second radiation characteristic if the danger position lies within the tolerance range of the route being currently traveled by the vehicle, in order to control the light emission of the at least one headlight. Method 200 may advantageously be carried out in connection with a device, such as the control device in FIG. 1. Consequently, the control device or the apparati of the control device in FIG. 1 may be developed to carry out the steps of method 200.

Figure 3:
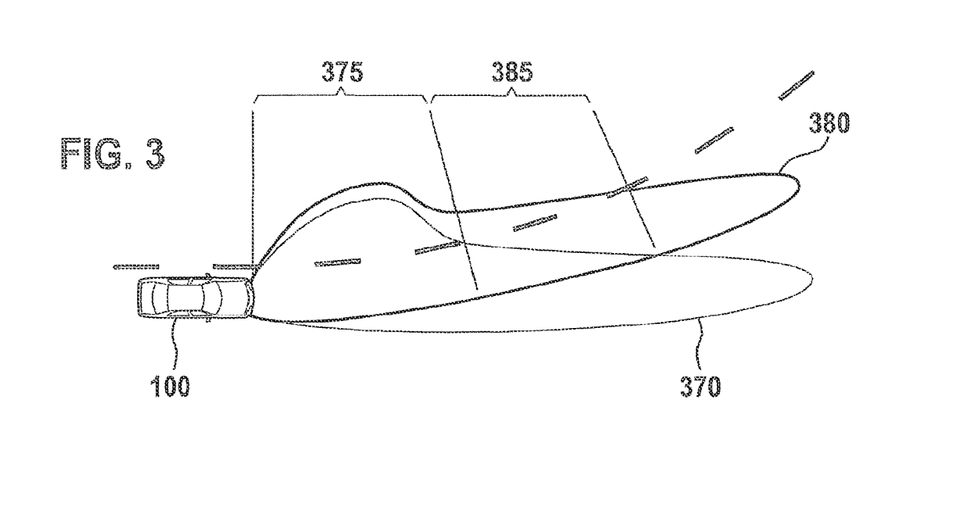
FIG. 3 shows an illustration of a vehicle at various radiation characteristics.

FIG. 3 shows an illustration of a vehicle at various radiation characteristics. What is shown is a vehicle 100, a first headlight setting or radiation characteristic 370, a first range of vision 375, a second headlight setting or radiation characteristic 380 and a second range of vision 385. Vehicle 100 is located in a curve. Vehicle 100 may be, for instance, the vehicle in FIG. 1 or another vehicle. First radiation characteristic 370 brings about a first light cone of vehicle 100. Second radiation characteristic 380 brings about a second light cone of vehicle 100. First radiation characteristic 370 may correspond to a normal lower beam light of vehicle 100. First range of vision 375 is associated with first radiation characteristic 370. Second radiation characteristic 380 may correspond to a dynamic swiveling headlight. Second range of vision 385 is associated with second radiation characteristic 380. Second range of vision 385 is doubled with respect to first range of vision 375.

Figure 4:
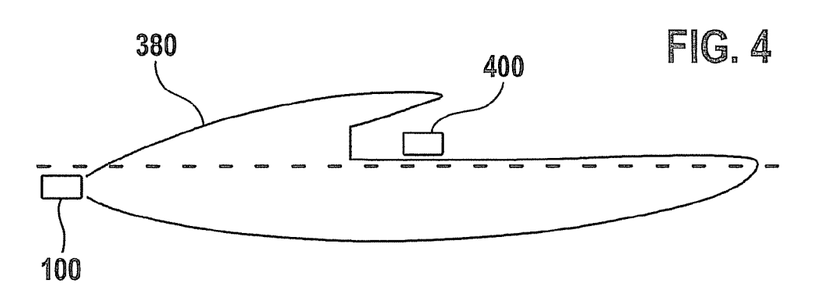
FIG. 4 shows an illustration of two vehicles at one radiation characteristic.

FIG. 4 shows an illustration of two vehicles at one radiation characteristic. What is shown is a vehicle 100, a radiation characteristic 380 and an additional vehicle or non-host vehicle 400. Vehicle 100 and non-host vehicle 400 are located on one road, at a distance from each other. Vehicle 100 and non-host vehicle 400 may move towards each other, for example, or travel one behind the other. Radiation characteristic 380 is associated with vehicle 100. Radiation characteristic 380 brings about a light cone which extends from vehicle 100 over twice the distance between vehicles 100 and 400. The light cone is developed so as not to pick up non-host vehicle 400, or hardly to do so. Consequently, non-host vehicle 400 is not, or hardly illuminated by the light cone.

Figure 5A:
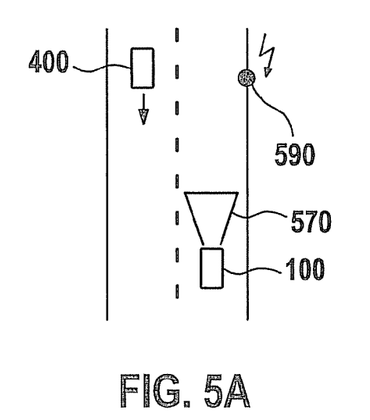
FIGS. 5A, 5B, 6A, 7A, 8A and 8B show schematic illustrations of traffic situations at various radiation characteristics.

FIG. 5A shows a schematic illustration of a traffic situation at one radiation characteristic. What is shown is a vehicle 100, a non-host vehicle 400, a radiation characteristic 570 and a danger position 590. Vehicle 100 may be the vehicle in FIG. 1. Vehicle 100 may also be referred to as Ego vehicle. Vehicle 100 and non-host vehicle 400 are located on one road. The road may be a Federal highway or a country road. The road has a straight course. Vehicle 100 and non-host vehicle 400 are moving towards each other in different lanes of the road. Non-host vehicle 400 consequently represents oncoming traffic for vehicle 100. Radiation characteristic 570 is associated with vehicle 100. Radiation characteristic 570 corresponds to a light cone of vehicle 100, in this instance. Radiation characteristic 570 may correspond to a lower beam light, for example. The light cone effected by radiation characteristic 570 is directed counter to the travel direction of non-host vehicle 400. Vehicle 100 and non-host vehicle 400 are at a distance from each other along a longitudinal extension direction of the road. The light cone effected by radiation characteristic 570 of vehicle 100 extends over a part of a distance between vehicle 100 and non-host vehicle 400. Danger position 590 represents a position of a danger or of an object from which a danger emanates. Danger position 590 is located in an edge region of the road, ahead of vehicle 100 in the travel direction. The distance between vehicle 100 and danger position 590 approximatively corresponds to the distance between vehicle 100 and non-host vehicle 400. The object may be, for example, a person at the edge of the road, another type of object at the edge of the road, or the like.

Figure 5B:
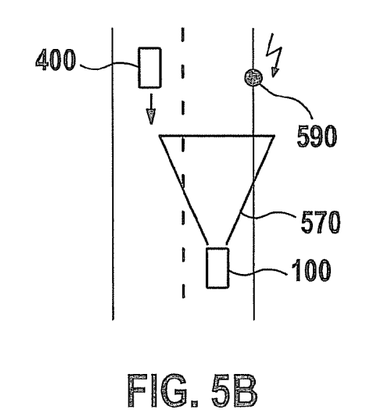

FIG. 5B shows a schematic illustration of a traffic situation at one radiation characteristic. The illustration in FIG. 5B corresponds to the representation of FIG. 5A with the exception that radiation characteristic 570 gives rise to a larger light cone than in FIG. 5A. The light cone effected by radiation characteristic 570 extends over a larger part of a distance between vehicle 100 and non-host vehicle 400 than in FIG. 5A. Radiation characteristic 570 may correspond to an upper beam light, for example.

Figure 5C:
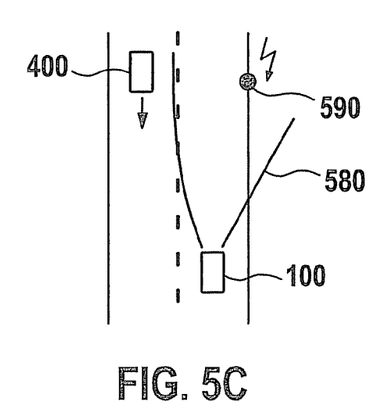
FIGS. 5C, 6B, 7B, 8C and 9 show schematic representations of traffic situations at various radiation characteristics according to exemplary embodiments of the present invention.

FIG. 5C shows a schematic illustration of a traffic situation at a radiation characteristic according to one exemplary embodiment of the present invention. The illustration in FIG. 5C corresponds to the illustration in FIG. 5A and FIG. 5B with the exception that vehicle 100 is associated with a radiation characteristic 580. Radiation characteristic 580 may be a radiation characteristic adjusted to a danger position 590. Radiation characteristic 580 brings about a light cone which illuminates danger position 590, non-host vehicle 400 being located outside the light cone brought about by radiation characteristic 580. The light cone brought about by radiation characteristic 580 is swiveled away from non-host vehicle 400 and towards danger position 590. Radiation characteristic 580 is able to be set, for example, while using a method for controlling a light emission of at least one headlight, such as the method in FIG. 2.

Figure 6A:
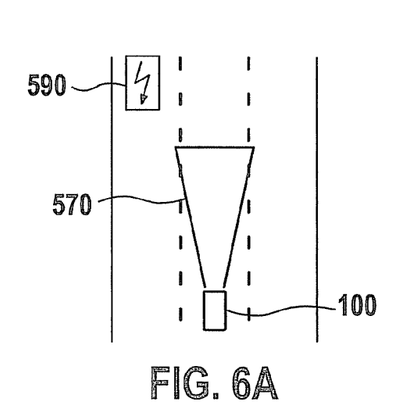

FIG. 6A shows a schematic illustration of a traffic situation at one radiation characteristic. The representation in FIG. 6A corresponds to the representation in FIG. 5B with the exception that in FIG. 6A no non-host vehicle is shown, the road has three lanes, vehicle 100 being located in the middle lane, and the danger position is located at a different place on the road. The road in FIG. 6A may be a superhighway, for example. The object from which the danger arises, at danger position 590, may be a nonilluminated vehicle in the left lane, for example. A light cone effected by radiation characteristic 570 of vehicle 100 extends over a part of a distance between vehicle 100 and danger position 590.

Figure 6B:
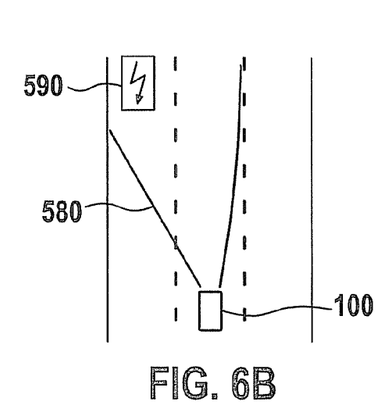

FIG. 6B shows a schematic illustration of a traffic situation at a radiation characteristic according to one exemplary embodiment of the present invention. The illustration in FIG. 6B corresponds to the illustration in FIG. 6A with the exception that vehicle 100 is associated with a radiation characteristic 580. Radiation characteristic 580 may be a radiation characteristic adjusted to a danger position 590. Radiation characteristic 580 gives rise to a light cone which illuminates danger position 590. The light cone brought about by radiation characteristic 580 is swiveled towards danger position 590. In this instance, the right lane of the road is essentially not illuminated by the light cone. Radiation characteristic 580 is able to be set, for example, while using a method for controlling a light emission of at least one headlight of a vehicle, such as the method in FIG. 2. Thus, in principle, the illustration in FIG. 6B also corresponds to the illustration in FIG. 5C.

Figure 7A:
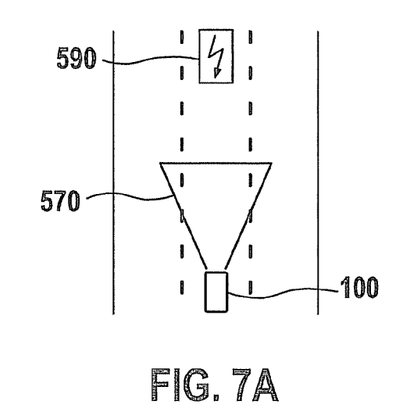

FIG. 7A shows a schematic illustration of a traffic situation at one radiation characteristic. The illustration in FIG. 7A corresponds to the illustration in FIG. 6A with the exception that danger position 590 is located in the middle lane. Consequently, vehicle 100 is located in the same lane as danger position 590.

Figure 7B:
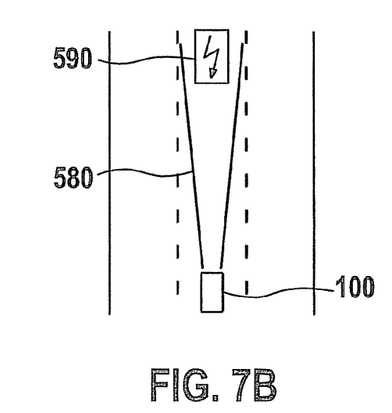

FIG. 7B shows a schematic illustration of a traffic situation at a radiation characteristic according to one exemplary embodiment of the present invention. The illustration in FIG. 7B corresponds to the illustration in FIG. 7A with the exception that vehicle 100 is associated with a radiation characteristic 580. Radiation characteristic 580 may be a radiation characteristic adjusted to a danger position 590. Radiation characteristic 580 gives rise to a light cone which illuminates danger position 590. Here, essentially only the middle lane is illuminated by the light cone. Radiation characteristic 580 is able to be set, for example, while using a method for controlling a light emission of at least one headlight of a vehicle, such as the method in FIG. 2. Thus, in principle, the illustration in FIG. 7B also corresponds to the illustration in FIGS. 5C and 6B.

Figure 8A:
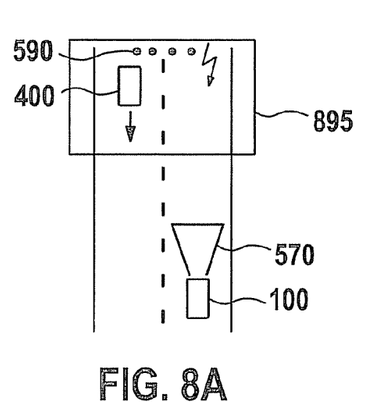

FIG. 8A shows a schematic illustration of a traffic situation at one radiation characteristic. The representation in FIG. 8A corresponds to the representation of FIG. 5A with the exception that danger position 590 is located at a different place on the road, and round about danger position 590 a tolerance range 895 is shown. In FIG. 8A, non-host vehicle 400 is located between vehicle 100 and danger position 590. At danger position 590, a danger of a plurality of objects may originate. The objects may be animals crossing the road or game. Tolerance range 895 extends transversely across the road, over both lanes and, at both sides of the road, over the edge of the road. Tolerance range 895 extends along a longitudinal direction of extension of the road over a specified segment. In FIG. 8A, non-host vehicle 400 is located within tolerance range 895. Tolerance range 895 takes into account a potential motion of the objects from which the danger arises, i.e. in this case also animals crossing the road, away from announced danger position 590.

Figure 8B:
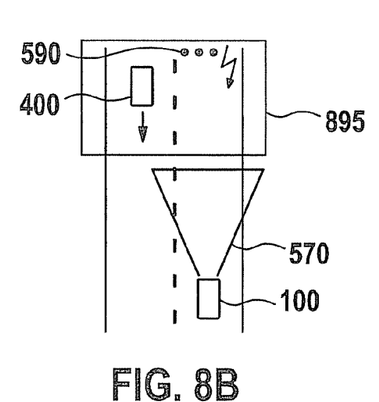

FIG. 8B shows a schematic illustration of a traffic situation at one radiation characteristic. The illustration in FIG. 8B corresponds to the representation of FIG. 8A with the exception that radiation characteristic 570 gives rise to a larger light cone than in FIG. 8A. The light cone effected by radiation characteristic 570 extends over a larger part of a distance between vehicle 100 and danger position 590 or tolerance range 895 than in FIG. 8A. Radiation characteristic 570 may correspond to an upper beam light, for example.

Figure 8C:
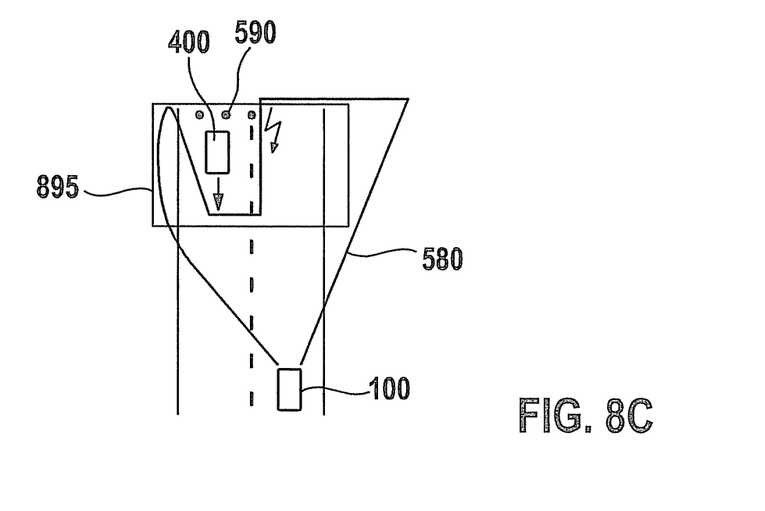

FIG. 8C shows a schematic illustration of a traffic situation at a radiation characteristic according to one exemplary embodiment of the present invention. The illustration in FIG. 8C corresponds to the illustration in FIG. 8A and FIG. 8B with the exception that vehicle 100 is associated with a radiation characteristic 580. Radiation characteristic 580 may be a radiation characteristic adjusted to a danger position 590 and/or tolerance range 895. Radiation characteristic 580 brings about a light cone which illuminates danger position 590 and a greater part of tolerance range 895, non-host vehicle 400 being located outside the light cone brought about by radiation characteristic 580. Radiation characteristic 580 may be similar, for example to the radiation characteristic shown in FIG. 4. Radiation characteristic 580 is able to be set, for example, while using a method for controlling a light emission of at least one headlight of a vehicle, such as the method in FIG. 2. Thus, in principle, the illustration in FIG. 8C also corresponds to the illustration in FIG. 5C, FIG. 6B and FIG. 7B.

Figure 9:
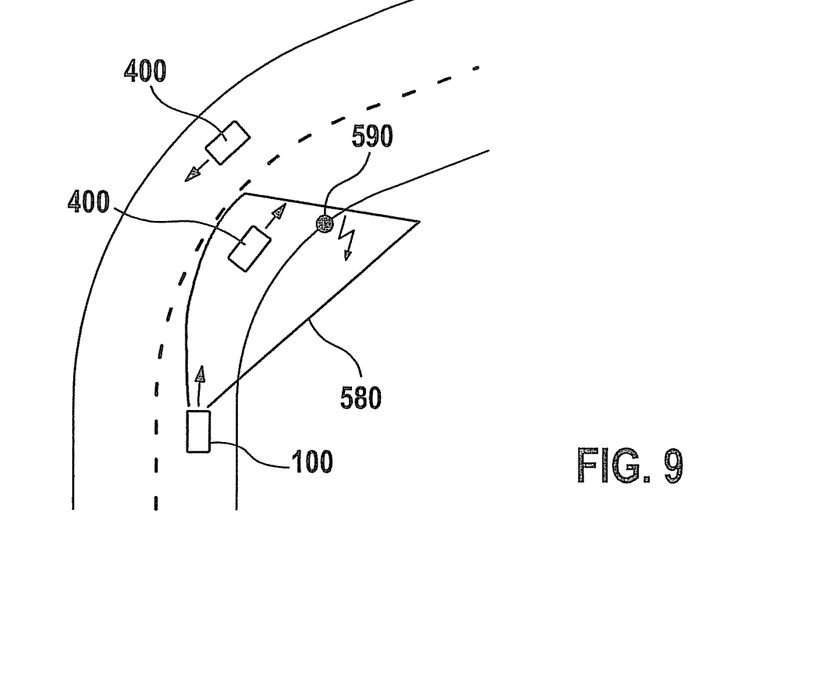

FIG. 9 shows a schematic illustration of a traffic situation at a radiation characteristic according to one exemplary embodiment of the present invention. The representation in FIG. 9 corresponds to the representation of FIG. 5C with the exception that two non-host vehicles 400 are shown and the road describes a curve. The road may be a superhighway or a Federal highway. The curve in FIG. 9 is a curve to the right, as seen in the travel direction of vehicle 100. The object, with which the danger at danger position 590 originates, may be, for instance, an object on the roadway of vehicle 100 or at the edge of the road. A first non-host vehicle 400 is located between vehicle 100 and danger position 590. First non-host vehicle 400 is located in the same lane and is moving in the same direction as vehicle 100. A second non-host vehicle 400 is located on the course of the road, approximately at the level of danger position 590. Second non-host vehicle 400 is located in a different lane from vehicle 100 and first non-host vehicle 400. Second non-host vehicle 400 is moving in the opposite direction with respect to vehicle 100 and first non-host vehicle 400. Second non-host vehicle 400 is thus oncoming traffic for vehicle 100 and first non-host vehicle 400. Radiation characteristic 580 gives rise to a light cone which illuminates danger position 590. The light cone brought about by radiation characteristic 580 does not illuminate second non-host vehicle 400. The light cone effected by radiation characteristic 580 may be developed to illuminate first non-host vehicle 400, and for its driver to be dazzled only a little or be free from being dazzled. Radiation characteristic 580 may correspond to a dynamic curve light, such as the one in FIG. 3, for example. Radiation characteristic 580 is able to be set, for example, while using a method for controlling a light emission of at least one headlight of a vehicle, such as the method in FIG. 2. Thus, in principle, the illustration in FIG. 8C also corresponds to the illustration in FIG. 5C, FIG. 6B and FIG. 7B.

In the following, an exemplary embodiment of the present invention is explained, in summary, with reference to FIGS. 1 through 9. First of all, a traffic broadcast danger warning in the form of a danger warning signal is received and read in. It is then ascertained whether the danger announced is on one's own route ahead. If the danger is not on one's own route, the next warning is awaited. Otherwise, the following steps are carried out. It is announced to the driver that the light systems be set appropriately for the danger message. The vehicle light may accordingly be adjusted to at least one following possibility. The upper beam light is switched on or is adjusted to the danger situation at the danger position. This means that the light cone of the upper beam light is set so that the coming danger situation is lit up well and other traffic participants, oncoming traffic if possible, traffic in the same lane and/or other lanes, are not dazzled. That is, the radiation characteristic of headlights 105 is changed. In the process, perhaps other light systems, such as a swiveling headlight system, is switched off using this method 200, or their functions will be limited and/or defined. Broadening examples are sketched in the following. If in vehicle 100, in addition, there exists an IHC system (headlight control system) as described above, which is able to detect visible oncoming traffic with the aid of a camera at its lights, this system may be used additionally in method 200. That is, using the system, it is checked whether and where other vehicles 400 are, in order not to dazzle them. After the danger situation or after passing danger position 590, the original status of the light of vehicle 100 is restored before danger position 590 and/or the danger warning announcement. In vehicle 100, if in addition an IHO system exists, this system may additionally be used in the step of restoring. That is, before the restoring of the original light status or original radiation characteristic 570, it is checked whether a non-host vehicle 400 is coming and the restoring is meaningful and causes, for instance, no dazzling of other traffic participants.

Consequently, according to exemplary embodiments of the present invention, there takes place an adaptation of, for example, intelligent vehicle lighting systems based on traffic broadcast danger warnings. One advantage of the present invention is that the driver of vehicle 100, as early as possible, has an optimal view of the danger situation at danger position 590.

What is claimed is:

1. A method for controlling a light emission of at least one headlight of a vehicle, comprising:
   reading in at least one danger warning signal received using a receiving device, the at least one danger warning signal indicating a danger position at which an object is located and which represents a danger for the vehicle;
   checking whether the danger position indicated by the at least one danger warning signal is within a specified tolerance range on a travel route currently being traveled by the vehicle; and
   changing the light emission of the at least one headlight from a first radiation characteristic to a second radiation characteristic if the danger position is within the specified tolerance range on the travel route currently being traveled by the vehicle;
   wherein the first radiation characteristic represents an original radiation characteristic and the second radiation characteristic represents a radiation characteristic adjusted to the indicated danger position, and wherein the indicated danger position is lit up more brightly using the second radiation characteristic than using the first radiation characteristic.

2. The method as recited in claim 1, wherein the second radiation characteristic is determined based on one of: (i) the at least one danger warning signal; or (ii) based on the at least one danger warning signal and a position of at least one additional vehicle in the surroundings of the indicated danger position.

3. The method as recited in claim 1, wherein the at least one danger warning signal additionally indicates a danger property.

4. The method as recited in claim 1, wherein the tolerance range is specified as a function of one of: (i) the at least one danger warning signal; or (ii) the at least one danger warning signal and a road property at the indicated danger position.

5. The method as recited in claim 1, wherein the light emission of the at least one headlight is changed if the vehicle has approached the indicated danger position no closer than a specified minimum distance.

6. The method as recited in claim 1, further comprising:
   changing the light emission of the at least one headlight from the second radiation characteristic to a third radiation characteristic if the vehicle has passed the danger position.

7. The method as recited in claim 1, further comprising:
   restoring the first radiation characteristic of the light emission of the at least one headlight if the vehicle has passed the danger position.

8. A control device for controlling a light emission of at least one headlight of a vehicle, comprising:
   a reading arrangement to read in at least one danger warning signal received using a receiving device, the at least one danger warning signal indicating a danger position at which an object is located and which represents a danger for the vehicle;
   a checking arrangement to check whether the danger position indicated by the at least one danger warning signal is within a specified tolerance range on a travel route currently being traveled by the vehicle; and
   a changing arrangement to change the light emission of the at least one headlight from a first radiation characteristic to a second radiation characteristic if the danger position is within the specified tolerance range on the travel route currently being traveled by the vehicle;
   wherein the first radiation characteristic represents an original radiation characteristic and the second radiation characteristic represents a radiation characteristic adjusted to the indicated danger position, and wherein the indicated danger position is lit up more brightly using the second radiation characteristic than using the first radiation characteristic.

9. A non-transitory computer-readable data storage medium storing a computer program having program codes which, when executed on a computer, implement a method for controlling a light emission of at least one headlight of a vehicle, the method comprising:
   reading in at least one danger warning signal received using a receiving device, the at least one danger warning signal indicating a danger position at which an object is located and which represents a danger for the vehicle;
   checking whether the danger position indicated by the at least one danger warning signal is within a specified tolerance range on a travel route currently being traveled by the vehicle; and
   changing the light emission of the at least one headlight from a first radiation characteristic to a second radiation characteristic if the danger position is within the specified tolerance range on the travel route currently being traveled by the vehicle;
   wherein the first radiation characteristic represents an original radiation characteristic and the second radiation characteristic represents a radiation characteristic adjusted to the indicated danger position, and wherein the indicated danger position is lit up more brightly using the second radiation characteristic than using the first radiation characteristic.

10. The computer-readable data storage medium as recited in claim 9, wherein the second radiation characteristic is determined based on one of: (i) the at least one danger warning signal; or (ii) based on the at least one danger warning signal and a position of at least one additional vehicle in the surroundings of the indicated danger position.

11. The computer-readable data storage medium as recited in claim 9, wherein the at least one danger warning signal additionally indicates a danger property.

12. The computer-readable data storage medium as recited in claim 9, wherein the tolerance range is specified as a function of one of: (i) the at least one danger warning signal; or (ii) the at least one danger warning signal and a road property at the indicated danger position.

13. The computer-readable data storage medium as recited in claim 9, wherein the light emission of the at least one headlight is changed if the vehicle has approached the indicated danger position no closer than a specified minimum distance.

14. The computer-readable data storage medium as recited in claim 9, further comprising:
changing the light emission of the at least one headlight from the second radiation characteristic to a third radiation characteristic if the vehicle has passed the danger position.

15. The computer-readable data storage medium as recited in claim 9, further comprising:
restoring the first radiation characteristic of the light emission of the at least one headlight if the vehicle has passed the danger position.

16. A non-transitory computer-readable data storage medium storing a computer program having program codes which, when executed on a computer, implement a method for controlling a light emission of at least one headlight of a vehicle, the method comprising:
reading in at least one danger warning signal received using a receiving device, the at least one danger warning signal indicating a danger position at which an object is located and which represents a danger for the vehicle;
checking whether the danger position indicated by the at least one danger warning signal is within a specified tolerance range on a travel route currently being traveled by the vehicle; and
changing the light emission of the at least one headlight from a first radiation characteristic to a second radiation characteristic if the danger position is within the specified tolerance range on the travel route currently being traveled by the vehicle;
wherein the first radiation characteristic represents an original radiation characteristic and the second radiation characteristic represents a radiation characteristic adjusted to the indicated danger position, wherein the indicated danger position is lit up more brightly using the second radiation characteristic than using the first radiation characteristic, and
wherein the second radiation characteristic is determined based on one of: (i) the at least one danger warning signal; or (ii) based on the at least one danger warning signal and a position of at least one additional vehicle in the surroundings of the indicated danger position, and wherein the tolerance range is specified as a function of one of: (i) the at least one danger warning signal; or (ii) the at least one danger warning signal and a road property at the indicated danger position.

17. The computer-readable data storage medium as recited in claim 16, wherein the at least one danger warning signal additionally indicates a danger property, and wherein the light emission of the at least one headlight is changed if the vehicle has approached the indicated danger position no closer than a specified minimum distance.

18. The computer-readable data storage medium as recited in claim 16, further comprising:
changing the light emission of the at least one headlight from the second radiation characteristic to a third radiation characteristic if the vehicle has passed the danger position; and
restoring the first radiation characteristic of the light emission of the at least one headlight if the vehicle has passed the danger position.

19. A method for controlling a light emission of at least one headlight of a vehicle, comprising:
reading in at least one danger warning signal received using a receiving device, the at least one danger warning signal indicating a danger position at which an object is located and which represents a danger for the vehicle;
checking whether the danger position indicated by the at least one danger warning signal is within a specified tolerance range on a travel route currently being traveled by the vehicle; and
changing the light emission of the at least one headlight from a first radiation characteristic to a second radiation characteristic if the danger position is within the specified tolerance range on the travel route currently being traveled by the vehicle;
wherein the first radiation characteristic represents an original radiation characteristic and the second radiation characteristic represents a radiation characteristic adjusted to the indicated danger position, wherein the indicated danger position is lit up more brightly using the second radiation characteristic than using the first radiation characteristic, and
wherein the second radiation characteristic is determined based on one of: (i) the at least one danger warning signal; or (ii) based on the at least one danger warning signal and a position of at least one additional vehicle in the surroundings of the indicated danger position, and wherein the tolerance range is specified as a function of one of: (i) the at least one danger warning signal; or (ii) the at least one danger warning signal and a road property at the indicated danger position.

20. The method as recited in claim 19, wherein the at least one danger warning signal additionally indicates a danger property, and wherein the light emission of the at least one headlight is changed if the vehicle has approached the indicated danger position no closer than a specified minimum distance.

21. The method as recited in claim 19, further comprising:
changing the light emission of the at least one headlight from the second radiation characteristic to a third radiation characteristic if the vehicle has passed the danger position; and
restoring the first radiation characteristic of the light emission of the at least one headlight if the vehicle has passed the danger position.

* * * * *